L. LEWIS.
CHURN TOP.
APPLICATION FILED DEC. 11, 1908.

947,922.

Patented Feb. 1, 1910.

WITNESSES:

INVENTOR
Lola Lewis,
BY
ATTORNEY

UNITED STATES PATENT OFFICE.

LOLA LEWIS, OF DAWSON, TEXAS.

CHURN-TOP.

947,922. Specification of Letters Patent. Patented Feb. 1, 1910.

Application filed December 11, 1908. Serial No. 466,946.

*To all whom it may concern:*

Be it known that I, LOLA LEWIS, citizen of the United States, residing at Dawson, in the county of Navarro and State of Texas, have invented certain new and useful Improvements in Churn-Tops, of which the following is a specification.

My invention relates to new and useful improvements in churn tops.

The object of the invention is to provide a churn top which owing to its peculiar shape will act to prevent the milk from spattering out of the churn during the churning operation, not interfere with the free operation of the dasher and at the same time keep flies and other insects out of the milk.

Another object is to provide a device of the character described that will be strong, durable, simple, efficient and comparatively inexpensive to construct, also one in which the several parts will not be liable to get out of working order.

Figures 1, 2:
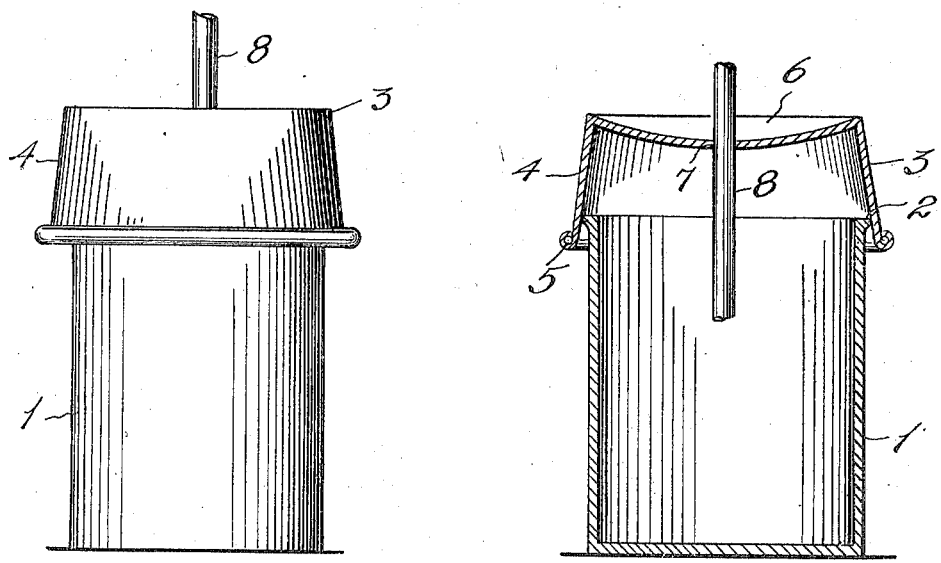
Figure 3:
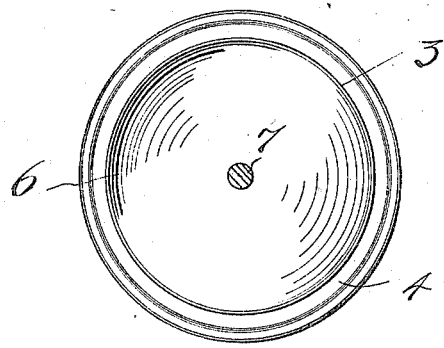

With the above and other objects in view, my invention has particular relation to certain novel features of construction and operation an example of which is described in the following specification and illustrated in the accompanying drawing, wherein:

Figure 1 is an elevation of a churn showing my top applied thereon, Fig. 2 is a vertical section of the same, and Fig. 3 is a plan view of the top.

In the drawings, the numeral 1 designates an ordinary cylindrical churn having a beaded upper edge 2 as shown in Fig. 2.

3 indicates the top which has a frusto-conical shape.

The top is preferably pressed into form or spun from a single piece of metal, its sides 4 flaring downwardly and its lower ends rolled about a wire ring 5. The top may thus be forced down onto the churn so as to frictionally engage the beaded portion 2 and form a tight joint; while the rolled edge prevents the lower end of the top from spreading and holds the same in shape.

The upper side of the top is dished or concaved as indicated at 6 and is provided with a central opening 7 through which the churn dasher-rod 8 freely passes. By reason of the dished portion any milk carried up on the rod and dropping or spattering from the same will be caught in the said dished portion and conducted down to the opening 7 through which it will pass into the churn.

In will be noted that the top extends some distance above the top of the churn proper and milk thrown up or spattered by the dasher will be deflected back into the churn by the inclined walls 3 and the dished portion 6 so that very little if any of the milk will be churned up through the opening 7. The top is readily placed on the churn and easily removed. The top is also sanitary and extremely easy to clean and maintain in a sanitary condition and at the same time is practically indestructible.

It is obvious that the frictional engagement of the beaded portion 2 will form a very tight joint preventing the passage of the milk thrown into contact with the top and such milk will run down on to the beaded portion and into the churn while flies or other insects cannot pass between the top of the upper edge of the churn as will be apparent.

What I claim, is:

The combination with a cylindrical churn having a beaded upper edge, of a top having downwardly flaring sides frictionally engaging the upper edge of a churn, and provided with a dished upper portion having a central dasher-rod opening.

In testimony whereof I have signed my name to this specification in the presence of two subscribing witnesses.

LOLA LEWIS.

Witnesses:
C. O. WEAVER,
J. T. LEE.